United States Patent
Albero et al.

(10) Patent No.: US 12,462,031 B2
(45) Date of Patent: *Nov. 4, 2025

(54) HYBRID MACHINE LEARNING AND KNOWLEDGE GRAPH APPROACH FOR ESTIMATING AND MITIGATING THE SPREAD OF MALICIOUS SOFTWARE

(71) Applicant: Bank of America Corporation, Charlotte, NC (US)

(72) Inventors: George Anthony Albero, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,923

(22) Filed: Jan. 11, 2024

(65) Prior Publication Data
US 2024/0143762 A1    May 2, 2024

Related U.S. Application Data

(63) Continuation of application No. 17/380,450, filed on Jul. 20, 2021, now Pat. No. 11,914,709.

(51) Int. Cl.
*G06F 21/56* (2013.01)
*G06N 5/04* (2023.01)
*G06N 20/00* (2019.01)

(52) U.S. Cl.
CPC ............. *G06F 21/566* (2013.01); *G06N 5/04* (2013.01); *G06N 20/00* (2019.01); *G06F 2221/033* (2013.01)

(58) Field of Classification Search
CPC .. G06F 21/566; G06F 2221/033; G06F 21/56; G06N 5/04; G06N 20/00; G06N 5/022
See application file for complete search history.

(56) References Cited

U.S. PATENT DOCUMENTS 7,010,696 B1 * 3/2006 Cambridge ........... G06F 21/577
    713/188
7,854,006 B1 * 12/2010 Andruss ................ H04L 63/145
    726/22

(Continued)

FOREIGN PATENT DOCUMENTS

JP    2016053979 A    4/2016

OTHER PUBLICATIONS

Nov. 24, 2023—(US) Notice of Allowance—U.S. Appl. No. 17/380,450.

(Continued)

*Primary Examiner* — Aravind K Moorthy
(74) *Attorney, Agent, or Firm* — Banner & Witcoff, Ltd.

(57) ABSTRACT

Aspects of the disclosure relate to predicting the spread of malicious software. The computing platform may identify malicious software at a computing device and may input characteristics of the malicious software into a machine learning model to produce time horizons for the malicious software. The computing platform may identify, using a knowledge graph and based on the time horizons, subsets of computing devices, each corresponding to a particular time horizon. The computing platform may perform, at a time within a first time horizon, a first security action for a first subset of computing devices within the first time horizon and a second security action for a second subset of computing devices located within a second time horizon, where the first time horizon and the second time horizon indicate that the first subset will be affected by the malicious software prior to the second subset.

20 Claims, 10 Drawing Sheets

(56) References Cited

U.S. PATENT DOCUMENTS

| | | | |
|---|---|---|---|
| 8,402,529 B1 | 3/2013 | Green et al. | |
| 8,762,298 B1 | 6/2014 | Ranjan et al. | |
| 9,202,054 B1* | 12/2015 | Lu | G06F 21/52 |
| 9,516,053 B1* | 12/2016 | Muddu | G06F 3/04847 |
| 9,594,906 B1 | 3/2017 | Langton et al. | |
| 9,690,933 B1* | 6/2017 | Singh | G06N 5/025 |
| 9,729,572 B1 | 8/2017 | Adams et al. | |
| 9,992,217 B2 | 6/2018 | Taylor et al. | |
| 10,003,985 B1 | 6/2018 | Holland et al. | |
| 10,104,120 B2 | 10/2018 | Gopalakrishna | |
| 10,114,954 B1* | 10/2018 | Bellis | G06F 21/577 |
| 10,284,556 B1 | 5/2019 | Sokolov et al. | |
| 10,313,379 B1* | 6/2019 | Han | G06N 5/04 |
| 10,356,119 B1* | 7/2019 | Chang | H04L 63/1433 |
| 10,410,158 B1* | 9/2019 | Yumer | G06N 20/00 |
| 10,437,999 B1* | 10/2019 | Bhattacharyya | G06F 16/13 |
| 10,546,123 B1 | 1/2020 | Lan et al. | |
| 10,706,144 B1 | 7/2020 | Moritz et al. | |
| 10,771,489 B1 | 9/2020 | Bisht et al. | |
| 10,885,167 B1* | 1/2021 | Lador | G06F 21/554 |
| 10,992,699 B1 | 4/2021 | Sites et al. | |
| 11,019,085 B1 | 5/2021 | Sokolov et al. | |
| 11,025,666 B1* | 6/2021 | Han | H04L 63/1416 |
| 11,032,315 B2* | 6/2021 | Compton | G06N 20/00 |
| 11,038,907 B2 | 6/2021 | Altman et al. | |
| 11,038,908 B2 | 6/2021 | Vega et al. | |
| 11,038,916 B1 | 6/2021 | Cao et al. | |
| 11,042,638 B2 | 6/2021 | Thornton et al. | |
| 11,044,264 B2 | 6/2021 | Joseph Durairaj et al. | |
| 11,048,706 B2 | 6/2021 | Saperstein et al. | |
| 11,048,718 B2 | 6/2021 | Khalil et al. | |
| 11,048,799 B2 | 6/2021 | Yoshimura | |
| 11,050,773 B2 | 6/2021 | Will et al. | |
| 11,055,063 B2 | 7/2021 | Goyal et al. | |
| 11,057,405 B2 | 7/2021 | Xu et al. | |
| 11,057,407 B2 | 7/2021 | Avrahami et al. | |
| 11,057,420 B2 | 7/2021 | McGrew et al. | |
| 11,062,024 B2 | 7/2021 | Nguyen et al. | |
| 11,063,966 B2 | 7/2021 | Brown et al. | |
| 11,063,974 B2 | 7/2021 | Cochin et al. | |
| 11,068,587 B1 | 7/2021 | Goradia | |
| 11,068,592 B1* | 7/2021 | Namballa | G06F 9/4843 |
| 11,068,595 B1 | 7/2021 | Chiang et al. | |
| 11,070,458 B2 | 7/2021 | Wong et al. | |
| 11,070,570 B2 | 7/2021 | Kostyushko et al. | |
| 11,070,575 B2 | 7/2021 | Ravindranath et al. | |
| 11,074,062 B1 | 7/2021 | Hosic et al. | |
| 11,082,446 B1* | 8/2021 | Thomas | H04L 63/145 |
| 11,109,194 B1 | 8/2021 | Pinheiro et al. | |
| 11,158,207 B1 | 10/2021 | Sadeh-Koniecpol et al. | |
| 11,222,112 B1* | 1/2022 | Satpathy | G06N 5/01 |
| 11,343,146 B1 | 5/2022 | Mohanty et al. | |
| 11,363,039 B2 | 6/2022 | Kaidi | |
| 11,457,031 B1 | 9/2022 | Bisht et al. | |
| 11,475,124 B2* | 10/2022 | Abbaszadeh | G06N 5/04 |
| 11,479,258 B1 | 10/2022 | Sanchez | |
| 11,503,061 B1* | 11/2022 | Lin | G06N 5/04 |
| 11,520,907 B1 | 12/2022 | Borowiec et al. | |
| 11,914,709 B2* | 2/2024 | Albero | G06F 21/566 |
| 12,174,915 B1* | 12/2024 | Maeng | G06F 18/2178 |
| 2004/0011163 A1 | 1/2004 | Hsien | |
| 2004/0111632 A1 | 6/2004 | Halperin | |
| 2005/0008652 A1 | 1/2005 | Lin et al. | |
| 2005/0086526 A1 | 4/2005 | Aguirre | |
| 2006/0002105 A1 | 1/2006 | Hinojosa, Jr. | |
| 2006/0021054 A1 | 1/2006 | Costa et al. | |
| 2007/0000631 A1 | 1/2007 | Grigoriev et al. | |
| 2007/0006313 A1 | 1/2007 | Porras et al. | |
| 2007/0214267 A1* | 9/2007 | Ogura | G06F 21/552 709/226 |
| 2008/0008677 A1 | 1/2008 | Ferrari et al. | |
| 2008/0086773 A1 | 4/2008 | Tuvell et al. | |
| 2008/0134335 A1* | 6/2008 | Kameda | H04L 63/145 726/24 |
| 2010/0008251 A1 | 1/2010 | Bender et al. | |
| 2010/0082513 A1 | 4/2010 | Liu | |
| 2011/0023118 A1* | 1/2011 | Wright | H04L 63/1441 726/23 |
| 2012/0016716 A1 | 1/2012 | Bai et al. | |
| 2012/0084859 A1* | 4/2012 | Radinsky | G06F 21/56 707/E17.046 |
| 2012/0167161 A1 | 6/2012 | Kim | |
| 2013/0081142 A1* | 3/2013 | McDougal | G06F 21/577 726/24 |
| 2014/0002596 A1 | 1/2014 | Antonio et al. | |
| 2014/0025960 A1 | 1/2014 | McLean | |
| 2014/0028306 A1 | 1/2014 | Gokmen et al. | |
| 2014/0028985 A1 | 1/2014 | Janssens | |
| 2014/0283066 A1 | 9/2014 | Teddy et al. | |
| 2014/0289853 A1 | 9/2014 | Teddy et al. | |
| 2015/0006683 A1 | 1/2015 | Panje et al. | |
| 2015/0006784 A1 | 1/2015 | Avila et al. | |
| 2015/0038164 A1 | 2/2015 | Elovici et al. | |
| 2015/0066832 A1 | 3/2015 | Kulik et al. | |
| 2015/0067845 A1 | 3/2015 | Chari et al. | |
| 2015/0067849 A1 | 3/2015 | Agrawal et al. | |
| 2015/0237068 A1* | 8/2015 | Sandke | H04L 63/1425 726/23 |
| 2015/0358341 A1* | 12/2015 | King-Wilson | H04L 63/14 726/23 |
| 2015/0381649 A1 | 12/2015 | Schultz et al. | |
| 2016/0028750 A1* | 1/2016 | Di Pietro | H04W 12/125 726/23 |
| 2016/0092684 A1* | 3/2016 | Langton | H04L 63/1433 726/23 |
| 2016/0292418 A1* | 10/2016 | Wojnowicz | G06N 3/08 |
| 2017/0026391 A1* | 1/2017 | Abu-Nimeh | G06F 21/552 |
| 2017/0030069 A1 | 2/2017 | Radford | |
| 2017/0126712 A1* | 5/2017 | Crabtree | H04L 63/1425 |
| 2017/0169230 A1* | 6/2017 | Zheng | G06N 20/00 |
| 2017/0230391 A1* | 8/2017 | Ferguson | G06N 7/01 |
| 2017/0230409 A1* | 8/2017 | Ahmed | H04L 63/1416 |
| 2017/0270297 A1* | 9/2017 | Watanabe | G06F 21/56 |
| 2017/0300693 A1 | 10/2017 | Zhang et al. | |
| 2018/0004006 A1 | 1/2018 | Hu et al. | |
| 2018/0004948 A1* | 1/2018 | Martin | H04L 63/1425 |
| 2018/0012144 A1* | 1/2018 | Ding | H04L 63/1466 |
| 2018/0012407 A1 | 1/2018 | Chuang et al. | |
| 2018/0023443 A1 | 1/2018 | Inclan et al. | |
| 2018/0032876 A1 | 2/2018 | Altshuller | G06F 16/258 |
| 2018/0039779 A1* | 2/2018 | Li | G06F 21/56 |
| 2018/0040064 A1 | 2/2018 | Grigg et al. | |
| 2018/0069883 A1* | 3/2018 | Meshi | H04L 63/1425 |
| 2018/0077146 A1* | 3/2018 | Lonas | G06F 21/32 |
| 2018/0124078 A1 | 5/2018 | Hajmasan et al. | |
| 2018/0157827 A1* | 6/2018 | Kang | G06F 12/14 |
| 2018/0234435 A1 | 8/2018 | Cohen et al. | |
| 2018/0234442 A1* | 8/2018 | Luo | H04L 63/1425 |
| 2018/0248894 A1* | 8/2018 | Greeter | G06N 10/00 |
| 2018/0268304 A1* | 9/2018 | Manadhata | G06N 5/04 |
| 2018/0288087 A1 | 10/2018 | Hittel et al. | |
| 2018/0293381 A1* | 10/2018 | Tseng | G06N 20/00 |
| 2018/0330083 A1* | 11/2018 | Abbaszadeh | G06N 5/04 |
| 2018/0351969 A1* | 12/2018 | MacLeod | G06F 11/2038 |
| 2019/0007433 A1* | 1/2019 | McLane | G06N 5/04 |
| 2019/0012197 A1 | 1/2019 | Memon et al. | |
| 2019/0013010 A1 | 1/2019 | Kokubo et al. | |
| 2019/0013234 A1 | 1/2019 | Bhattacharyya | |
| 2019/0018821 A1 | 1/2019 | Ormont et al. | |
| 2019/0028107 A1 | 1/2019 | Srivastava | |
| 2019/0034632 A1* | 1/2019 | Tsao | G06F 21/566 |
| 2019/0068618 A1* | 2/2019 | Mestha | H04L 63/1466 |
| 2019/0102554 A1* | 4/2019 | Luo | G06N 5/025 |
| 2019/0121975 A1 | 4/2019 | Pavlyushchik et al. | |
| 2019/0121976 A1 | 4/2019 | Pavlyushchik et al. | |
| 2019/0130101 A1 | 5/2019 | Chen et al. | |
| 2019/0132344 A1 | 5/2019 | Lem et al. | |
| 2019/0140929 A1* | 5/2019 | Ruelle | G08B 1/08 |
| 2019/0171816 A1* | 6/2019 | Copty | G06N 20/00 |
| 2019/0188218 A1 | 6/2019 | Harris et al. | |
| 2019/0199746 A1* | 6/2019 | Doron | G06N 20/00 |
| 2019/0245866 A1* | 8/2019 | Anderson | H04L 63/166 |
| 2019/0260778 A1* | 8/2019 | Chen | H04L 63/1425 |
| 2019/0260782 A1* | 8/2019 | Humphrey | H04L 63/1483 |

(56) References Cited

U.S. PATENT DOCUMENTS

| | | |
|---|---|---|
| 2019/0281078 A1 | 9/2019 | Eguiarte Salazar et al. |
| 2020/0000509 A1 | 1/2020 | Hayashida et al. |
| 2020/0005093 A1 | 1/2020 | Vichare et al. |
| 2020/0006796 A1 | 1/2020 | Su et al. |
| 2020/0006797 A1 | 1/2020 | Park et al. |
| 2020/0008208 A1 | 1/2020 | Kim et al. |
| 2020/0017761 A1 | 1/2020 | Li |
| 2020/0019568 A1 | 1/2020 | Lewis et al. |
| 2020/0020199 A1 | 1/2020 | Higgins et al. |
| 2020/0024467 A1 | 1/2020 | Hioki |
| 2020/0024469 A1 | 1/2020 | Guo et al. |
| 2020/0025985 A1 | 1/2020 | Teissier et al. |
| 2020/0034535 A1* | 1/2020 | Toley ................. G06F 21/6209 |
| 2020/0036731 A1* | 1/2020 | Bochare ............... H04L 63/145 |
| 2020/0039619 A1 | 2/2020 | Stephanuik et al. |
| 2020/0040169 A1 | 2/2020 | Maldonado |
| 2020/0057857 A1* | 2/2020 | Roytman ............... G06N 20/20 |
| 2020/0067969 A1 | 2/2020 | Abbaszadeh et al. |
| 2020/0067975 A1 | 2/2020 | Ojha et al. |
| 2020/0082081 A1 | 3/2020 | Sarin et al. |
| 2020/0125728 A1* | 4/2020 | Savir ...................... G06F 21/554 |
| 2020/0143045 A1* | 5/2020 | Joye ........................ G06F 21/75 |
| 2020/0159924 A1* | 5/2020 | Tran ....................... G06F 21/566 |
| 2020/0177615 A1 | 6/2020 | Grabois et al. |
| 2020/0177617 A1 | 6/2020 | Hadar et al. |
| 2020/0195683 A1 | 6/2020 | Kuppa et al. |
| 2020/0201995 A1 | 6/2020 | Gahlot et al. |
| 2020/0218805 A1* | 7/2020 | Liu ........................ G06N 3/044 |
| 2020/0242255 A1* | 7/2020 | Sharma ................. G06F 21/565 |
| 2020/0244673 A1 | 7/2020 | Stockdale et al. |
| 2020/0244691 A1 | 7/2020 | Veeramany et al. |
| 2020/0259852 A1 | 8/2020 | Wolff et al. |
| 2020/0273172 A1* | 8/2020 | Weldemariam ........ G06N 5/022 |
| 2020/0279043 A1* | 9/2020 | Thornton ............... G06N 5/022 |
| 2020/0320438 A1* | 10/2020 | Lin .......................... G06N 5/01 |
| 2020/0396190 A1* | 12/2020 | Pickman ............... H04L 67/306 |
| 2020/0401696 A1 | 12/2020 | Ringlein et al. |
| 2020/0412743 A1* | 12/2020 | Baracaldo Angel ... G06N 20/10 |
| 2021/0001200 A1 | 1/2021 | Yang et al. |
| 2021/0002162 A1 | 1/2021 | Deka et al. |
| 2021/0004726 A1* | 1/2021 | Shang .................... G06F 18/24 |
| 2021/0005841 A1 | 1/2021 | Ohta |
| 2021/0006476 A1 | 1/2021 | Greenberg et al. |
| 2021/0006754 A1 | 1/2021 | Seaman et al. |
| 2021/0009212 A1 | 1/2021 | Vollertsen |
| 2021/0012001 A1 | 1/2021 | Nishino et al. |
| 2021/0016816 A1 | 1/2021 | Schillinger et al. |
| 2021/0019492 A1 | 1/2021 | Yeke Yazdandoost et al. |
| 2021/0021629 A1 | 1/2021 | Dani et al. |
| 2021/0021631 A1* | 1/2021 | Okutan .................. H04L 63/164 |
| 2021/0024850 A1 | 1/2021 | Perera et al. |
| 2021/0027396 A1 | 1/2021 | Nalwoga |
| 2021/0035209 A1 | 2/2021 | Peak |
| 2021/0040943 A1 | 2/2021 | Coppeta et al. |
| 2021/0049413 A1* | 2/2021 | Ma .......................... G06F 21/53 |
| 2021/0058415 A1 | 2/2021 | Sanzgiri et al. |
| 2021/0064760 A1 | 3/2021 | Sharma et al. |
| 2021/0067548 A1 | 3/2021 | Brandt et al. |
| 2021/0081270 A1* | 3/2021 | Abbaszadeh ......... G06F 18/295 |
| 2021/0092129 A1 | 3/2021 | Aksela |
| 2021/0165882 A1* | 6/2021 | Das ....................... G06F 21/563 |
| 2021/0168161 A1* | 6/2021 | Dunn ..................... H04L 51/212 |
| 2021/0194900 A1* | 6/2021 | Schmidtler ............. H04L 67/06 |
| 2021/0194924 A1* | 6/2021 | Heinemeyer .......... H04L 51/212 |
| 2021/0224425 A1* | 7/2021 | Nasr-Azadani .......... G06N 5/04 |
| 2021/0243208 A1 | 8/2021 | Rubin et al. |
| 2021/0248503 A1 | 8/2021 | Hickey et al. |
| 2021/0266345 A1* | 8/2021 | Chen .................. H04L 63/1425 |
| 2021/0273961 A1 | 9/2021 | Humphrey et al. |
| 2021/0329026 A1* | 10/2021 | Bogdan .................... G06N 7/08 |
| 2021/0334363 A1* | 10/2021 | Kim ........................ G06F 21/54 |
| 2021/0342451 A1* | 11/2021 | Okada ..................... G06F 21/44 |
| 2021/0344693 A1* | 11/2021 | Azad ..................... G06F 21/566 |
| 2021/0352095 A1 | 11/2021 | Cam |
| 2021/0360013 A1* | 11/2021 | Huang ................ H04L 63/1408 |
| 2021/0392147 A1* | 12/2021 | Ma ....................... H04L 63/1416 |
| 2021/0406368 A1* | 12/2021 | Agranonik ............... G06N 3/08 |
| 2021/0409220 A1* | 12/2021 | Seraj .......................... H04L 9/50 |
| 2021/0409439 A1 | 12/2021 | Engelberg et al. |
| 2022/0004630 A1* | 1/2022 | Almukaynizi .......... G06F 21/57 |
| 2022/0006045 A1 | 1/2022 | Wang et al. |
| 2022/0006709 A1 | 1/2022 | Deval et al. |
| 2022/0007019 A1 | 1/2022 | He |
| 2022/0007820 A1 | 1/2022 | Williamson et al. |
| 2022/0013189 A1 | 1/2022 | Berman et al. |
| 2022/0013858 A1 | 1/2022 | Nakazawa et al. |
| 2022/0015637 A1 | 1/2022 | Chefitz et al. |
| 2022/0016444 A1 | 1/2022 | Park et al. |
| 2022/0017995 A1 | 1/2022 | Kubushiro |
| 2022/0017996 A1 | 1/2022 | Yadav et al. |
| 2022/0019674 A1 | 1/2022 | Frey et al. |
| 2022/0020102 A1 | 1/2022 | Udell |
| 2022/0024775 A1 | 1/2022 | Xie |
| 2022/0030165 A1 | 1/2022 | Denney et al. |
| 2022/0031178 A1 | 2/2022 | Brulet et al. |
| 2022/0034299 A1 | 2/2022 | Chen et al. |
| 2022/0034548 A1 | 2/2022 | Atatekin |
| 2022/0036060 A1 | 2/2022 | Ramos et al. |
| 2022/0040012 A1 | 2/2022 | Blomstr?M |
| 2022/0040562 A1 | 2/2022 | Walker |
| 2022/0060453 A1 | 2/2022 | Crabtree et al. |
| 2022/0067097 A1 | 3/2022 | Gupta et al. |
| 2022/0070196 A1 | 3/2022 | Sarkar et al. |
| 2022/0078203 A1 | 3/2022 | Shakarian et al. |
| 2022/0083661 A1* | 3/2022 | Ma ......................... G06F 18/214 |
| 2022/0129923 A1* | 4/2022 | Kelton ............... G06Q 30/0202 |
| 2022/0131894 A1 | 4/2022 | Hassanzadeh et al. |
| 2022/0138584 A1 | 5/2022 | Cintas et al. |
| 2022/0141252 A1* | 5/2022 | Shi ........................ H04L 63/102 |
| | | 726/22 |
| 2022/0147815 A1* | 5/2022 | Conwell ................. G06N 3/045 |
| 2022/0150275 A1* | 5/2022 | McNee ................ H04L 63/1441 |
| 2022/0156377 A1 | 5/2022 | Xie et al. |
| 2022/0164447 A1 | 5/2022 | Yi et al. |
| 2022/0179952 A1 | 6/2022 | Lawrence et al. |
| 2022/0179964 A1 | 6/2022 | Qiao et al. |
| 2022/0201023 A1 | 6/2022 | Kels et al. |
| 2022/0210172 A1* | 6/2022 | Tan ........................ G06F 21/554 |
| 2022/0217177 A1* | 7/2022 | Beaver ................ H04L 63/1466 |
| 2022/0247759 A1 | 8/2022 | Wang et al. |
| 2022/0269949 A1* | 8/2022 | Scheideler ............. G06N 3/088 |
| 2022/0292202 A1* | 9/2022 | Manevich .............. G06F 21/53 |
| 2022/0301658 A1 | 9/2022 | Zamft et al. |
| 2022/0303290 A1* | 9/2022 | Baidya ................ H04L 63/1441 |
| 2022/0311783 A1 | 9/2022 | Meena |
| 2022/0334546 A1* | 10/2022 | D'Amato .............. H04W 12/63 |
| 2022/0342990 A1 | 10/2022 | Zhang et al. |
| 2022/0345489 A1 | 10/2022 | Karabey et al. |
| 2022/0360601 A1 | 11/2022 | Rose |
| 2022/0368696 A1 | 11/2022 | Karpovsky et al. |
| 2022/0385676 A1* | 12/2022 | Chen Kaidi ........ H04L 63/1416 |
| 2022/0398308 A1* | 12/2022 | Zerah ...................... G06F 21/52 |
| 2022/0400120 A1 | 12/2022 | Veshchikov |
| 2022/0405386 A1* | 12/2022 | Gaber ..................... G06F 21/55 |
| 2022/0405623 A1 | 12/2022 | Cheng et al. |
| 2022/0414531 A1* | 12/2022 | Ong ....................... G06F 21/577 |
| 2023/0010064 A1 | 1/2023 | Sarwar et al. |
| 2023/0100643 A1 | 3/2023 | Wang et al. |
| 2023/0123046 A1 | 4/2023 | Wang et al. |
| 2023/0252192 A1* | 8/2023 | Nagata .................... G06F 21/71 |
| | | 726/23 |

OTHER PUBLICATIONS

Sep. 8, 2023—(US) Ex Parte Quayle Action—U.S. Appl. No. 17/380,450.

\* cited by examiner

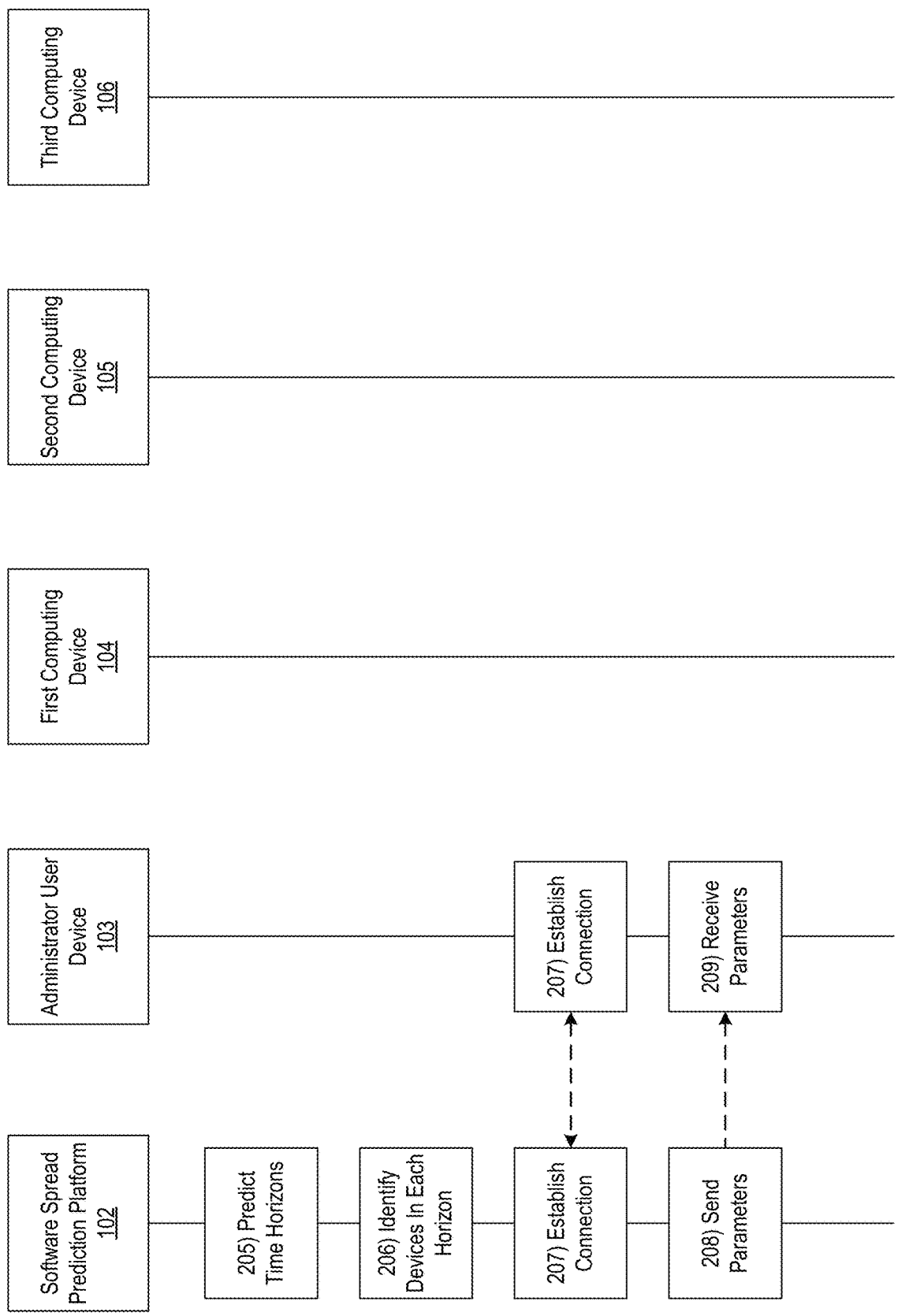

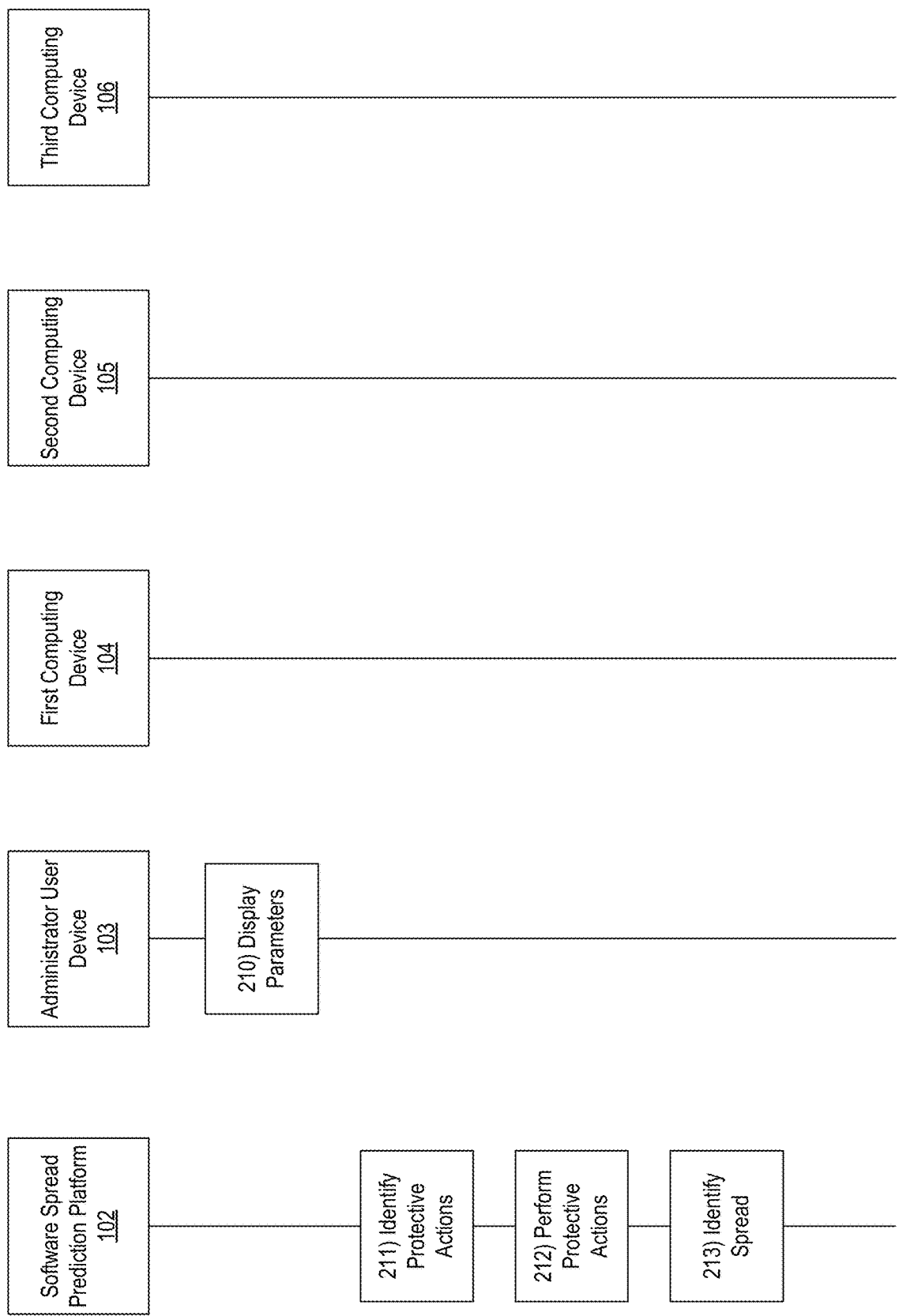

HYBRID MACHINE LEARNING AND KNOWLEDGE GRAPH APPROACH FOR ESTIMATING AND MITIGATING THE SPREAD OF MALICIOUS SOFTWARE

CROSS-REFERENCE TO RELATED APPLICATIONS

The present application is a continuation of co-pending U.S. application Ser. No. 17/380,450 filed Jul. 20, 2021, entitled "HYBRID MACHINE LEARNING AND KNOWLEDGE GRAPH APPROACH FOR ESTIMATING AND MITIGATING THE SPREAD OF MALICIOUS SOFTWARE" the contents of which are hereby incorporated by reference in their entirety.

BACKGROUND

Aspects of the disclosure relate to preventing the spread of malicious software. Once introduced to a network, malicious software may spread to additional devices. In some instances, a pure graphical approach may be used to analyze all nodes connected to a current point of attack. However, such methods may be computationally expensive and time consuming (e.g., due to size of such graphs, which may include billions of devices if not more). Accordingly, application of such methods may result in processing inefficiencies and/or time delays, during which malicious software may continue to spread undetected.

SUMMARY

Aspects of the disclosure provide effective, efficient, scalable, and convenient technical solutions that address and overcome the technical problems associated with preventing spread of malicious software. In accordance with one or more embodiments of the disclosure, a computing platform comprising at least one processor, a communication interface, and memory storing computer-readable instructions may generate a knowledge graph that includes a plurality of computing devices and indicates relationships between the plurality of computing devices. The computing platform may train, using historical information, a machine learning model, which may configure the machine learning model to predict time horizons for spread of malicious software, where each of the time horizons may include a subset of the plurality of computing devices. The computing platform may identify malicious software at one device of the plurality of computing devices. The computing platform may input characteristics of the malicious software into the machine learning model to produce time horizons for the identified malicious software. The computing platform may identify, using the knowledge graph and based on the time horizons for the identified malicious software, subsets of the plurality of computing devices, each corresponding to a particular time horizon. The computing platform may perform, at a time within a first time horizon, a first security action for at least a first subset of the plurality of computing devices located within the first time horizon and a second security action for at least a second subset of the plurality of computing devices located within a second time horizon, where the first time horizon and the second time horizon indicate that the first subset of the plurality of computing devices may be affected by the identified malicious software prior to the second subset of the plurality of computing devices.

In one or more instances, the plurality of computing devices may include devices of different device types. In one or more instances, training the machine learning model may include training the machine learning model to predict the spread of malicious software based on velocity and acceleration of the malicious software.

In one or more examples, inputting the characteristics of the malicious software into the machine learning model may include: 1) identifying, that the identified malicious software has not previously been identified, 2) predicting, based on similarities between the identified malicious software and previously identified malicious software, characteristics for the malicious software; and 3) inputting, into the machine learning model, the characteristics.

In one or more instances, inputting the characteristics of the malicious software into the machine learning model may include: 1) identifying that the identified malicious software was previously identified, 2) accessing historical characteristic information for the identified malicious software, and 3) inputting, into the machine learning model, the historical characteristic information. In one or more instances, the characteristics and the historical characteristic information may include one or more of: location information, network traffic, date of attack, time of attack, or holiday information.

In one or more examples, producing the time horizons for the malicious software may include: 1) identifying, using the machine learning model, a velocity and an acceleration of the malicious software, and 2) identifying, using the machine learning model and based on the velocity and the acceleration, the time horizons, where the time horizons indicate predicted boundaries of a network that will be affected by the malicious software at various future times. In one or more examples, identifying the subsets of the plurality of computing devices, each corresponding to a particular time horizon may include identifying, by applying the time horizons to the knowledge graph, computing devices that are predicted to be affected by the malicious software at different future times.

In one or more instances, performing the first security action may include quarantining the first subset of the plurality of computing devices based on identifying that the first subset of the plurality of computing devices is within the first time horizon, and performing the second security action may include sending a firewall update to the second subset of the plurality of computing devices based on identifying that the second subset of the plurality of computing devices is outside of the first time horizon and within the second time horizon, where the firewall update is configured to block the malicious software from affecting the second subset of the plurality of computing devices.

In one or more examples, the computing platform may identify that the malicious software has moved from the first time horizon to the second time horizon. Based on identifying that the malicious software has moved from the first time horizon to the second time horizon, the computing platform may identify whether or not the first subset of the plurality of computing devices remain affected by the malicious software. If the first subset of the plurality of computing devices is no longer affected by the malicious software, the computing platform may: 1) stop performance of the first security action for the first subset of the plurality of computing devices, and 2) replace performance of the second security action for the second subset of the plurality of computing devices with performance of the first security action. If the first subset of the plurality of computing devices is still affected by the malicious software, the computing platform may: 1) continue to perform the first security action for the first subset of the plurality of computing devices, and 2) replace performance of the second security action for the second subset of the plurality of computing devices with performance of the first security action.

In one or more instances, performing the first security actions and the second security actions may include steering the malicious software into a secure sandbox. In one or more instances, steering the malicious software into the secure sandbox may include: 1) identifying a type of device affected by the malicious software, and 2) causing the secure sandbox to resemble the type of device affected by the malicious software.

In one or more examples, the computing platform may analyze, at the secure sandbox, the malicious software to identify additional information about the malicious software, and may update the first security action and the second security action based on the additional information. In one or more examples, the computing platform may embed, at the secure sandbox and into the malicious software, tracking information, where the additional information about the malicious software may be identified using the tracking information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing a hybrid machine learning and knowledge graph method to predict the spread of malicious software in accordance with one or more example embodiments;

DETAILED DESCRIPTION

Figure 1A:
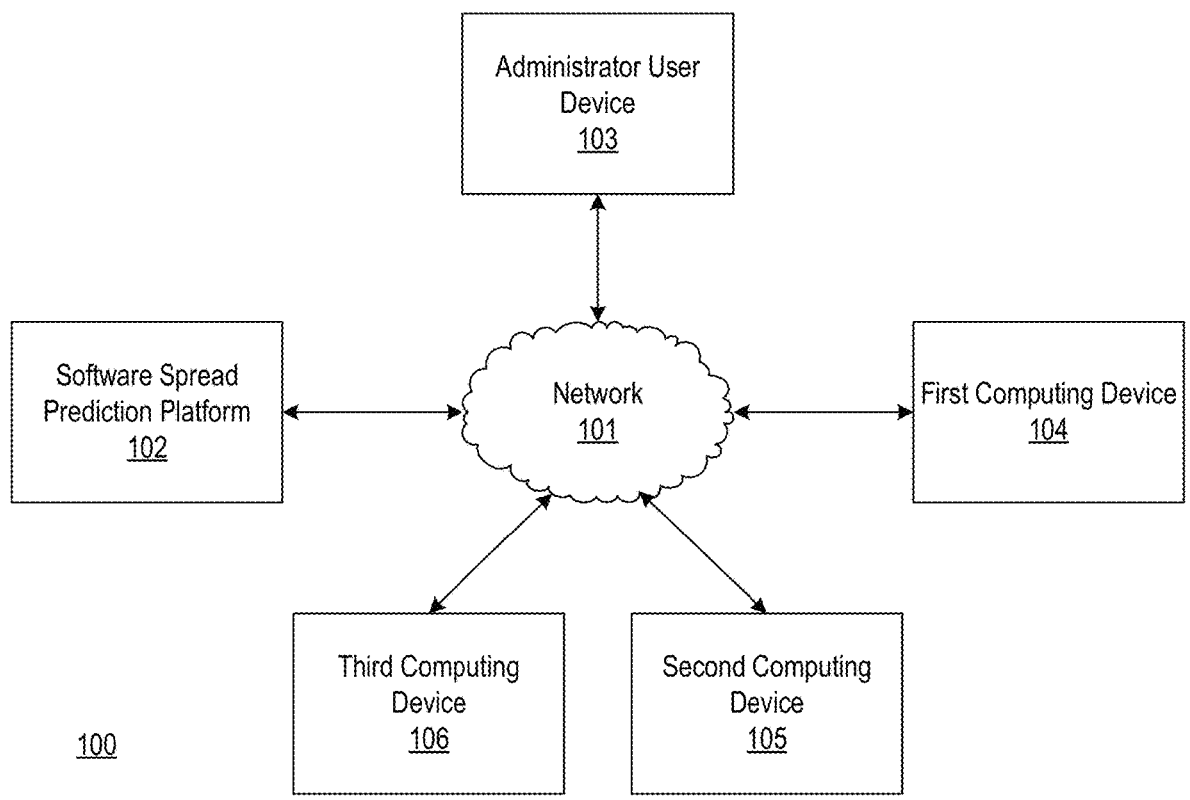
FIGS. 1A-1B depict an illustrative computing environment for implementing a hybrid machine learning and knowledge graph method to predict the spread of malicious software in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to using a hybrid machine learning and knowledge-based approach to predict the spread of malicious software. For example, the spread of malicious software may depend on a point of a current attack, and may be based on, for example, the speed of connectivity with other locations, network traffic, day and time of attack, local holidays and celebration, demographics, human skills, and/or other factors. Current methods may use a graph or network-based connectivity analysis for all the points that are connected to current points of attack. However, there may be problems associated with this network-based analysis. For example, such methods may be computationally expensive since parsing large network graphs (e.g., which may include billions of computing devices connected on a network), may be very expensive (or otherwise impossible). Furthermore, such methods may consider a conservative and brute-force approach, which may be time consuming. Accordingly, there is a need for a fast method that may predict, in advance, sections of a network that may be vulnerable to a next attack, so that mitigating actions may be performed, in advance, at these locations.

Accordingly, a hybrid approach is described here. A machine learning method may be used to predict a boundary using historic data and computation of speed and acceleration of the boundary based on locations, network traffic, day and time of attack, local holidays, and/or other information. Once a location boundary is established, a network or graph-based method may be used to find actual locations that may be potentially attacked. Based on the next potential locations, mitigating actions may be taken such as taking the location off the network, getting the latest anti-virus patch, and/or other actions.

To predict the spread of malicious software, both current velocity and acceleration may be predicted. The velocity and acceleration at any location of the infection may depend on factors such as speed of connectivity with other locations, network traffic, day/time of attack, local holidays, demographics, human skills, and/or other factors. A machine learning method may use historic data along with a historic time series spread of malicious software to predict the attack horizon along with the speed and acceleration at each of the points and their directions. The attack horizon may be computed iteratively based on the current attack horizon and the velocity and acceleration vectors at each of the points on the current attack horizon. Alternatively, the velocity and acceleration vectors may be known at a sufficient number of points, and may be used to interpolate the points to create the next attack horizon. Once an attack horizon is computed, a network analysis may be completed only within that horizon to determine the systems that may be impacted and may need protection.

In some instances, automated mitigations of vulnerable systems may include one or more of: disconnecting/quarantining a system to prevent spread, applying new and more secure firewalls, applying a latest patch or antivirus software, guiding the virus to virtual dead-ends or a sandbox to watch replication and providing a feedback loop to AI, allowing the virus to pick up a Trojan horse, and/or other actions.

These and other features are described in further detail below.

Figure 1B:
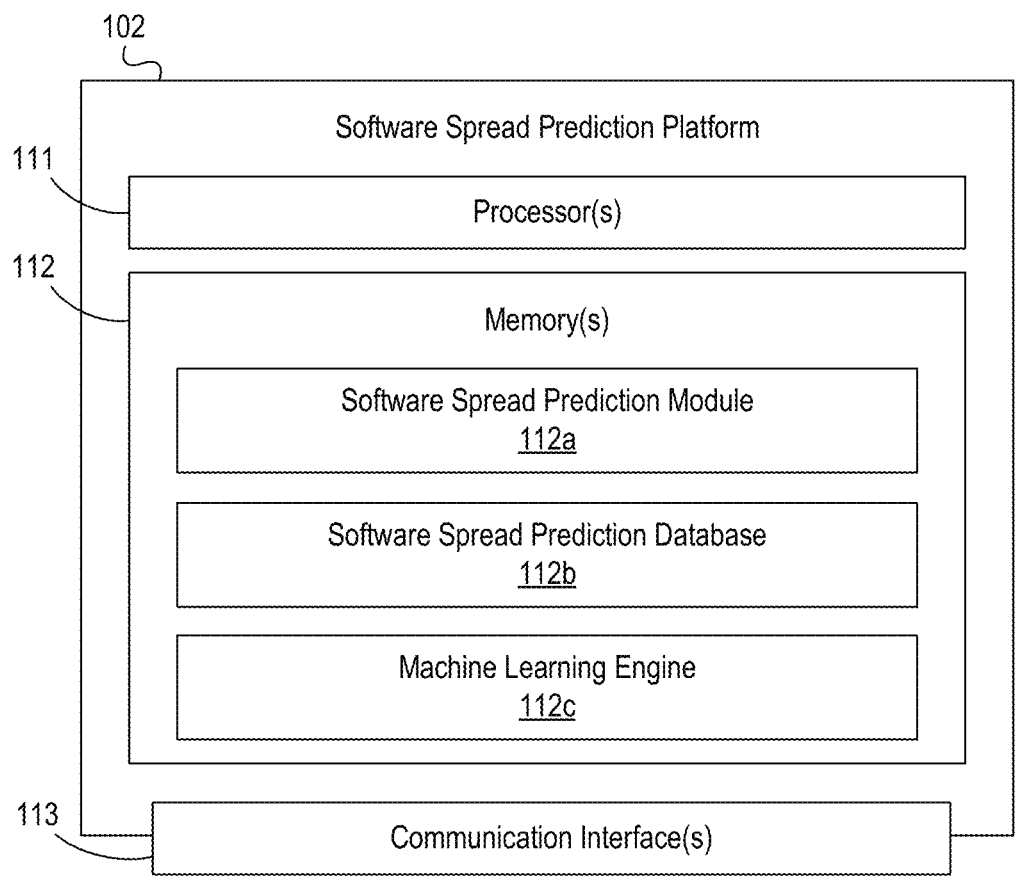

FIGS. 1A-1B depict an illustrative computing environment that implements a hybrid machine learning and knowledge graph method to predict the spread of malicious software in accordance with one or more example embodiments. Referring to FIG. 1A, computing environment 100 may include one or more computer systems. For example, computing environment 100 may include a software spread prediction platform 102, administrator user device 103, first computing device 104, second computing device 105, and third computing device 106.

As described further below, software spread prediction platform 102 may be a computer system that includes one or more computing devices (e.g., servers, server blades, or the like) and/or other computer components (e.g., processors, memories, communication interfaces) that may be used to train, host, and/or otherwise maintain a machine learning model and knowledge graph, which may subsequently be used to predict the spread of malicious software.

Administrator user device 103 may be a laptop computer, desktop computer, mobile device, tablet, smartphone, and/or other device that may be used by an individual (e.g., a network administrator, cyber security analyst, or other employee) identify the spread of malicious software. In some instances, administrator user device 103 may be configured to display one or more user interfaces (e.g., interfaces depicting the spread of malicious software, or the like).

First computing device 104 may be a laptop computer, desktop computer, mobile device, tablet, smartphone, and/or other device that may be vulnerable to the spread of malicious software. In some instances, the software spread prediction platform 102 may predict that the first computing device 104 falls within a first time horizon.

Second computing device 105 may be a laptop computer, desktop computer, mobile device, tablet, smartphone, and/or other device that may be vulnerable to the spread of malicious software. In some instances, the software spread prediction platform 102 may predict that the second computing device 105 falls within a second time horizon, different than the first time horizon.

Third computing device 106 may be a laptop computer, desktop computer, mobile device, tablet, smartphone, and/or other device that may be vulnerable to the spread of malicious software. In some instances, the software spread prediction platform 102 may predict that the third computing device 106 falls within a third time horizon, different than the first time horizon and the second time horizon.

Computing environment 100 also may include one or more networks, which may interconnect software spread prediction platform 102, administrator user device 103, first computing device 104, second computing device 105, and third computing device 106. For example, computing environment 100 may include a network 101 (which may interconnect, e.g., software spread prediction platform 102, administrator user device 103, first computing device 104, second computing device 105, and third computing device 106).

In one or more arrangements, software spread prediction platform 102, administrator user device 103, first computing device 104, second computing device 105, and third computing device 106 may be any type of computing device capable of sending and/or receiving requests and processing the requests accordingly. For example, software spread prediction platform 102, administrator user device 103, first computing device 104, second computing device 105, third computing device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of software spread prediction platform 102, administrator user device 103, first computing device 104, second computing device 105, and/or third computing device 106 may, in some instances, be special-purpose computing devices configured to perform specific functions.

Referring to FIG. 1B, software spread prediction platform 102 may include one or more processors 111, memory 112, and communication interface 113. A data bus may interconnect processor 111, memory 112, and communication interface 113. Communication interface 113 may be a network interface configured to support communication between software spread prediction platform 102 and one or more networks (e.g., network 101, or the like). Memory 112 may include one or more program modules having instructions that when executed by processor 111 cause software spread prediction platform 102 to perform one or more functions described herein and/or one or more databases that may store and/or otherwise maintain information which may be used by such program modules and/or processor 111. In some instances, the one or more program modules and/or databases may be stored by and/or maintained in different memory units of software spread prediction platform 102 and/or by different computing devices that may form and/or otherwise make up software spread prediction platform 102. For example, memory 112 may have, host, store, and/or include software spread prediction module 112a, software spread prediction database 112b, and/or machine learning engine 112c.

Software spread prediction module 112a may have instructions that direct and/or cause software spread prediction platform 102 to identify the spread of malicious software, as discussed in greater detail below. Software spread prediction database 112b may store information used by software spread prediction module 112a and/or software spread prediction platform 102 in application of advanced techniques to perform software spread prediction, and/or in performing other functions. Machine learning engine 112c may be used by software spread prediction platform 102 and/or software spread prediction module 112a to refine and/or otherwise update methods for predicting the spread of malicious software, and/or other methods described herein.

Figure 2A:
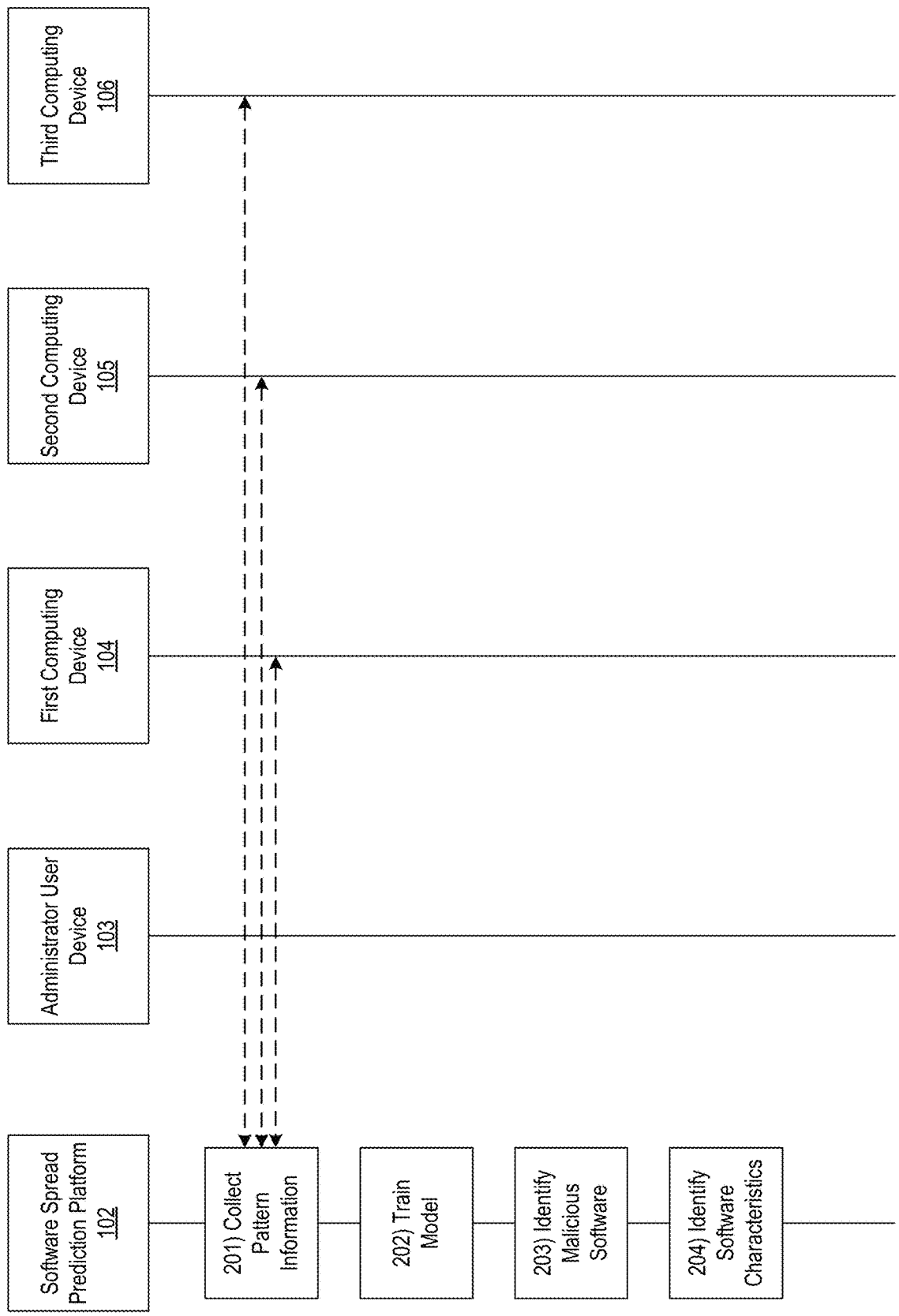

FIGS. 2A-2F depict an illustrative event sequence for implementing a hybrid machine learning and knowledge graph method to predict the spread of malicious software in accordance with one or more example embodiments. Referring to FIG. 2A, at step 201, the software spread prediction platform 102 may collect historical pattern information for the spread of malicious software across a plurality of computing devices (which may, e.g., include the first computing device 104, the second computing device 105, and the third computing device 106). For example, the software spread prediction platform 102 may collect information about previous spreads of malicious software across the plurality of computing devices (e.g., which devices were affected, velocity of the spread, acceleration of the spread, types of affected devices, location of the malicious software, network traffic, date/time of attack, holiday information, and/or other information).

At step 202, the software spread prediction platform 102 may train a machine learning model using the historical pattern information. For example, the software spread prediction platform 102 may train the machine learning model to identify and/or otherwise compute a velocity and acceleration of malicious software based on the other historical pattern information. Additionally, the software spread prediction platform 102 may train the machine learning model to identify, based on the velocity and the acceleration of the malicious software, time horizons corresponding to a predicted spread of the malicious software. For example, in identifying the time horizons, the software spread prediction platform 102 may identify a first distance, within which computing devices may be affected by the malicious software by a first time period, a second distance, within which computing devices will be affected by the malicious software by a second time period, and so on. For example, in training the machine learning model, the software spread prediction platform 102 may train the following algorithm: v*t=d, where v is the velocity of the malicious software, t is the elapsed time, and d is a distance traveled (which may e.g., be measured in hops on the network, physical distance, and/or other metrics). In some instances, the velocity may increase by a constant acceleration (a), which may be factored into the algorithm as well. For example, v may be equal to a*t, and d may be equal to $0.5(a)(t)^2$.

In addition, the software spread prediction platform 102 may generate a knowledge graph that includes the plurality of computing devices and relationships between the plurality of computing devices. For example, the knowledge graph may show a network path between two or more computing devices of the plurality of computing devices. In some instances, the plurality of computing devices may include one or more types of devices (e.g., servers, server blades, laptop computers, mobile devices, smartphones, tablets, desktop computers, database storage systems, and/or other devices).

At step 203, the software spread prediction platform 102 may identify malicious software at a computing device (e.g., first computing device 104). For example, the software spread prediction platform 102 may identify the malicious software based on feedback from a user and/or automatically based on virus detection software running at the first computing device or other means.

At step 204, the software spread prediction platform 102 may identify characteristics of the malicious software (e.g., which devices are affected, types of affected devices, location of the malicious software, network traffic, date/time of attack, holiday information, and/or other information). In some instances, the software spread prediction platform 102 may identify, based on any identified characteristics, that the malicious software has previously been identified, and may identify additional characteristics of the malicious software based on the previous identification (e.g., access historical characteristic information, which may have been stored after a previous identification). In other instances, the software spread prediction platform 102 may identity, based on any identified characteristics, that the malicious software has not previously been identified (e.g., it is a new virus or the like), but may identify similarities between the identified characteristics and characteristics of other previously identified malicious software (e.g., a similar but different virus). In these instances, the software spread prediction platform 102 may use the similar characteristics to extrapolate additional characteristics for the identified malicious software based on the previously identified malicious software.

Figure 4:
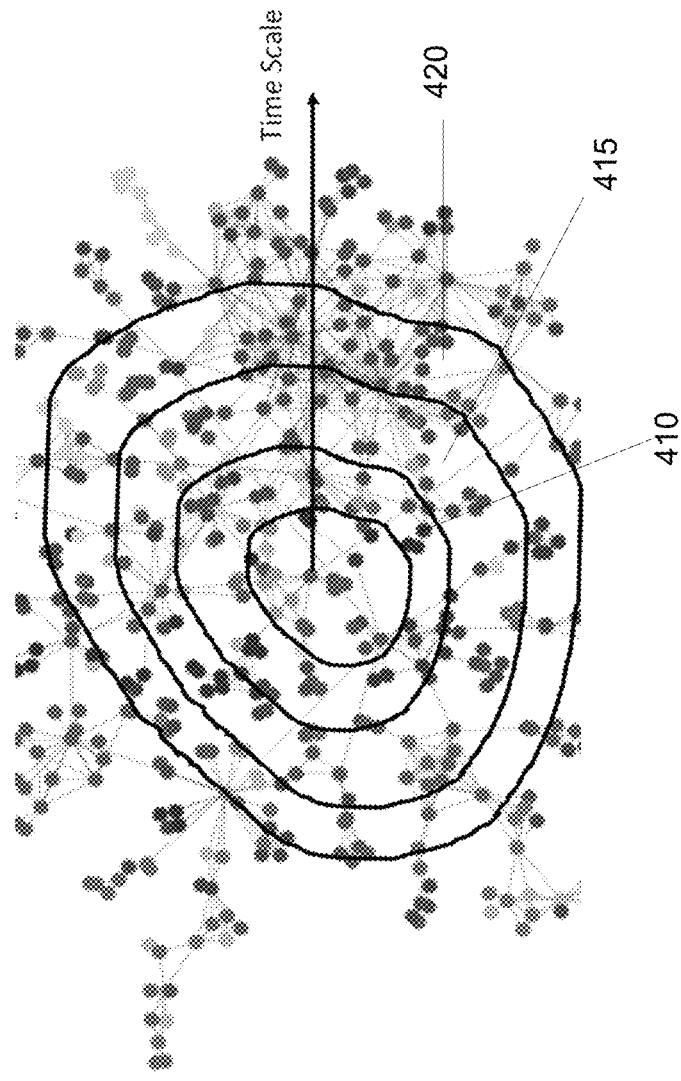
FIG. 4 depicts illustrative graphical user interfaces for implementing a hybrid machine learning and knowledge graph method to predict the spread of malicious software in accordance with one or more example embodiments.

Referring to FIG. 2B, at step 205, the software spread prediction platform 102 may input the characteristics of the malicious software into the machine learning model to identify predicted velocity and/or acceleration for the spread of the malicious software. In some instances, the machine learning model may predict the velocity and/or acceleration based on similarities between the identified malicious software and the historical pattern information. Additionally or alternatively, the software spread prediction platform 102 may identify a current velocity and/or acceleration for the spread of the malicious software (e.g., based on identified spread of the malicious software and a duration of time corresponding to the spread). After predicting the velocity and/or acceleration of the spread, the software spread prediction platform 102 may use the machine learning model to predict time horizons for the spread. For example, in predicting the time horizons, the software spread prediction platform 102 may predict a circumference within which the malicious software may spread to other devices within a first time period, a second, larger circumference within which the malicious software may spread to yet additional devices within a second time period, and so on (e.g., as illustrated by the concentric circles depicted on the administrator interface 405 in FIG. 4). In some instances, these time horizons may represent geographic regions, nodal/hop distances, and/or other distances. Although three time horizons are described herein, any number of time horizons may be identified without departing from the scope of the disclosure, and similarly, and number of devices may be located in each horizon (e.g., not limited to a single device).

At step 206, software spread prediction platform 102 may identify, based on the predicted time horizons and using the knowledge graph, devices corresponding to each time horizon. For example, the software spread prediction platform 102 may use the knowledge graph to identify subsets of the plurality of computing devices that are located within each time horizon. For example, as shown on the administrator interface 405 in FIG. 4, a first subset of the plurality of computing devices may be located within the first time horizon (e.g., first time horizon 410), a second subset of the plurality of computing devices may be located outside the first time horizon, but within the second time horizon (e.g., second time horizon 415), a third subset of the plurality of computing devices may be located outside the second time horizon but within the third time horizon (e.g., third time horizon 420), and so on. For example, the software spread prediction platform 102 may identify that the first computing device 104 is located within the first time horizon, the second computing device 105 is located within the second time horizon, and the third computing device 106 is located within the third time horizon. In some instances, in identifying the devices for each time horizon, the software spread prediction platform 102 may identify all devices located in the corresponding time horizons. In other instances, the software spread prediction platform 102 may identify a type of device being affected by the malicious software, and identify only devices of that type located in each of the corresponding time horizons.

At step 207, the software spread prediction platform 102 may establish a connection with the administrator user device 103. For example, the software spread prediction platform 102 may establish a first wireless data connection with the administrator user device 103 to link the software spread prediction platform 102 to the administrator user device 103 (e.g., in preparation for sending parameters of the spread of the malicious software). In some instances, the software spread prediction platform 102 may identify whether or not a connection is established with the administrator user device 103. If a connection is already established with the administrator user device 103, the software spread prediction platform 102 might not re-establish the connection. If a connection is not yet established with the administrator user device 103, the software spread prediction platform 102 may establish the first wireless data connection as described herein.

At step 208, the software spread prediction platform 102 may send the parameters of the spread of the malicious software to the administrator user device 103. For example, the software spread prediction platform 102 may send the parameters via the communication interface 113 and while the first wireless data connection is established. In some instances, the software spread prediction platform 102 may also send one or more commands directing the administrator user device 103 to display the parameters.

At step 209, administrator user device 103 may receive the parameters. For example, the administrator user device 103 may receive the parameters while the first wireless data connection is established. In some instances, the administrator user device 103 may receive the one or more commands directing the administrator user device 103 to display the parameters.

Referring to FIG. 2C, at step 210, based on or in response to the one or more commands directing the administrator user device 103 to display the parameters, the administrator user device 103 may display the parameters. For example, the administrator user device 103 may display a graphical user interface that depicts the time horizons overlaid on the knowledge graph, and/or a velocity, acceleration, and/or other information about the malicious software and/or the spread thereof.

At step 211, the software spread prediction platform 102 may identify one or more protective actions to be performed at each computing device based on the corresponding time horizons. For example, the software spread prediction platform 102 may identify a first protective action to be performed at the first computing device 104 because the first computing device 104 is within the first time horizon. In addition, the software spread prediction platform 102 may identify a second protective action to be performed at the second computing device 105 because the second computing device 105 is within the second time horizon, but outside the first time horizon. Similarly, the software spread prediction platform 102 may identify a third protective action for the third computing device 106 because the third computing device 106 is within the third time horizon, but outside the second time horizon. In some instances, the software spread prediction platform 102 may identify a more severe protective action for computing devices within the first time horizon than those in the second or third time horizons because the computing devices within the first time horizon may be at the greatest risk of infection by the malicious software in the shortest amount of time. For example, the software spread prediction platform 102 may identify that the first computing device 104 should be taken offline and quarantined, whereas the second computing device 105 should receive a firewall update (which may e.g., be created to block the malicious software), and the third computing device 106 should receive a notification about the malicious software. In some instances, in identifying the protective actions, the software spread prediction platform 102 may disconnect/quarantine a system, apply new/more secure firewalls, apply a most recent patch or anti-virus software, guide the virus to a virtual dead-end or sandbox (which may e.g., provide feedback to the machine learning model), allow the virus to pick up a Trojan horse, and/or identify other protective actions.

At step 212, the software spread prediction platform 102 may perform the protective actions identified at step 211. For example, the software spread prediction platform 102 may quarantine the first computing device 104, send a firewall update to the second computing device 105, and send a notification to the third computing device 106.

At step 213, the software spread prediction platform 102 may identify that the malicious software has spread to computing devices in a second time horizon. In some instances, the software spread prediction platform 102 may identify that the malicious software has actually spread to computing devices in the second time horizon. In other instances, the software spread prediction platform 102 might not identify actual spread, but may determine that a predicted time of the spread (e.g., a time corresponding to the second time horizon) has been reached. In some instances, based on the spread of the malicious software, the software spread prediction platform 102 may update and/or otherwise refine the time horizons and/or the machine learning model so as to increase accuracy. For example, if the software spread prediction platform 102 identifies that the malicious software is spreading faster or slower than anticipated, predictions may be adjusted.

Figure 2D:
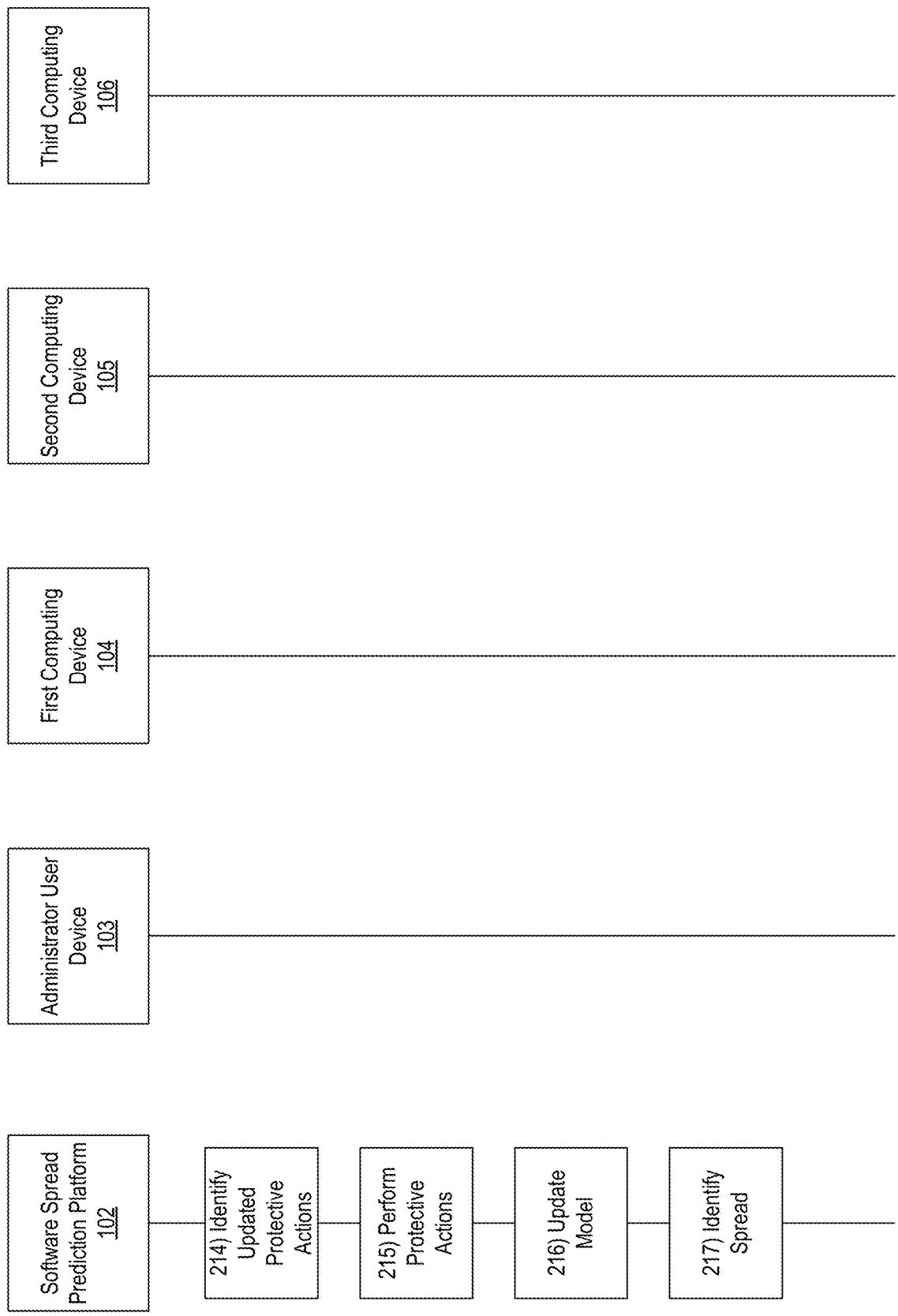

Referring to FIG. 2D, at step 214, the software spread prediction platform 102 may identify updated protective actions. For example, the software spread prediction platform 102 may identify whether or not the devices in the first time horizon are still affected by the malicious software. If the software spread prediction platform 102 identifies that devices in the first time horizon have been cleared of the malicious software, and it may identify that these devices may be brought back online. If instead the software spread prediction platform 102 identifies that devices in the first time horizon have not been cleared of the malicious software, it may continue to perform a protective action to these devices (e.g., continue to quarantine these devices). However, now that the malicious software has spread to the devices in the second time horizon, the software spread prediction platform 102 may identify that the devices in the second time horizon should be quarantined (e.g., the protective action originally applied to the devices in the second time horizon should be replaced by the protective action originally applied to the devices in the first time horizon, or other more severe protective action), and the firewall update should be deployed to devices in the third time horizon (e.g., because they are now closer (physically and/or temporally) to being infected by the malicious software than when the initial protective actions were identified). In some instances, in identifying the updated protective actions, the software spread prediction platform 102 may identify that the malicious software should be steered to a secure sandbox (e.g., by quarantining/not quarantining particular devices so as to allow the malicious software to travel through a selected path of devices that ends in the sandbox). In doing so, the software spread prediction platform 102 may focus/concentrate protective computing resources on the most at risk/vulnerable sections of the network.

At step 215, the software spread prediction platform 102 may perform the updated protective actions identified at step 214. For example, the software spread prediction platform 102 may bring the first computing device 104 back online, quarantine the second computing device 105, and send a firewall update to the third computing device 106.

At step 216, the software spread prediction platform 102 may update the machine learning model based on the spread of the malicious software. For example, the software spread prediction platform 102 may compare the time of the detected spread to the time prediction of the second time horizon. The software spread prediction platform 102 may use any discrepancy between these times to refine the machine learning model (e.g., so as to output increasingly accurate time horizons). In some instances, the software spread prediction platform 102 may update future time horizons based on the accuracy of the third time horizon.

At step 217, the software spread prediction platform 102 may identify that the malicious software has spread to computing devices in a third time horizon. In some instances, the software spread prediction platform 102 may identify that the malicious software has actually spread to computing devices in the third time horizon, while in other instances, the software spread prediction platform 102 might not identify actual spread, but may determine that a predicted time of the spread (e.g., a time corresponding to the third time horizon) has been reached. In some instances, based on the spread of the malicious software, the software spread prediction platform 102 may update and/or otherwise refine the time horizons and/or the machine learning model so as to increase accuracy. For example, if the software spread prediction platform 102 identifies that the malicious software is spreading faster or slower than anticipated, predictions/time horizons may be adjusted.

Figure 2E:
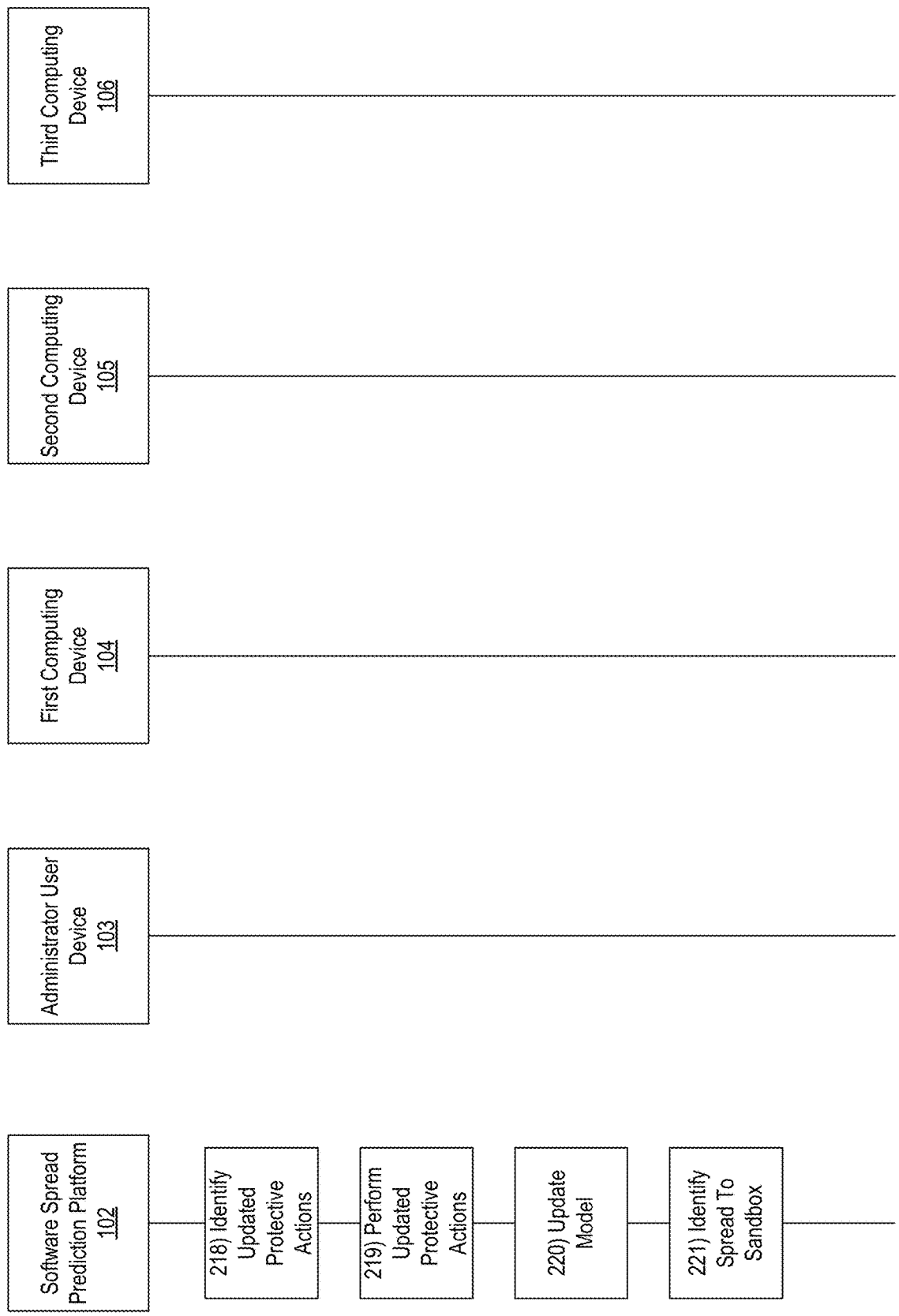

Referring to FIG. 2E, at step 218, the software spread prediction platform 102 may identify further updated protective actions. For example, the software spread prediction platform 102 may identify that devices in the second time horizon have been cleared of the malicious software, and may be brought back online. However, now that the malicious software has spread to the devices in the third time horizon, the software spread prediction platform 102 may identify that the devices in the third time horizon should be quarantined. In some instances, in doing so, the software spread prediction platform 102 may perform similar actions as those described above at step 214. For example, the software spread prediction platform 102 may identify whether devices in the second time horizon have been cleared and, if so, stop the corresponding protective actions, and if not, continue to perform the corresponding protective actions. Similarly, the software spread prediction platform 102 may replace a previously performed protective action for the devices in the third time horizon with an updated, more severe protective action (e.g., from firewall updates to quarantine). In doing so, the software spread prediction platform 102 may focus/concentrate protective computing resources on the most at risk/vulnerable sections of the network.

At step 219, the software spread prediction platform 102 may perform the further updated protective actions identified at step 214. For example, the software spread prediction platform 102 may bring the second computing device 105 back online and quarantine the third computing device 106.

At step 220, the software spread prediction platform 102 may update the machine learning model based on the spread of the malicious software. For example, the software spread prediction platform 102 may compare the time of the detected spread to the time prediction of the third time horizon. The software spread prediction platform 102 may use any discrepancy between these times to refine the machine learning model (e.g., so as to output increasingly accurate time horizons). In some instances, the software spread prediction platform 102 may update future time horizons based on the accuracy of the third time horizon.

At step 221, the software spread prediction platform 102 may identify that the malicious software has spread to a secure sandbox. For example, as part of the above described protective actions, the software spread prediction platform 102 may implement network policies so as to steer the malicious software into a secure sandbox. In some instances, to do so, the software spread prediction platform 102 may intentionally quarantine/not quarantine certain devices so as to intentionally allow the malicious software to spread along a path that leads to the secure sandbox. In some instances, the software spread prediction platform 102 may identify a type of device to which the malicious software is spreading (e.g., only to database systems, or some other type of system). In these instances, the software spread prediction platform 102 may cause the secure sandbox to appear (from the perspective of the malicious software) to be the type of device to which the malicious software is spreading (e.g., to effectively lure the malicious software to the secure sandbox).

Figure 2F:
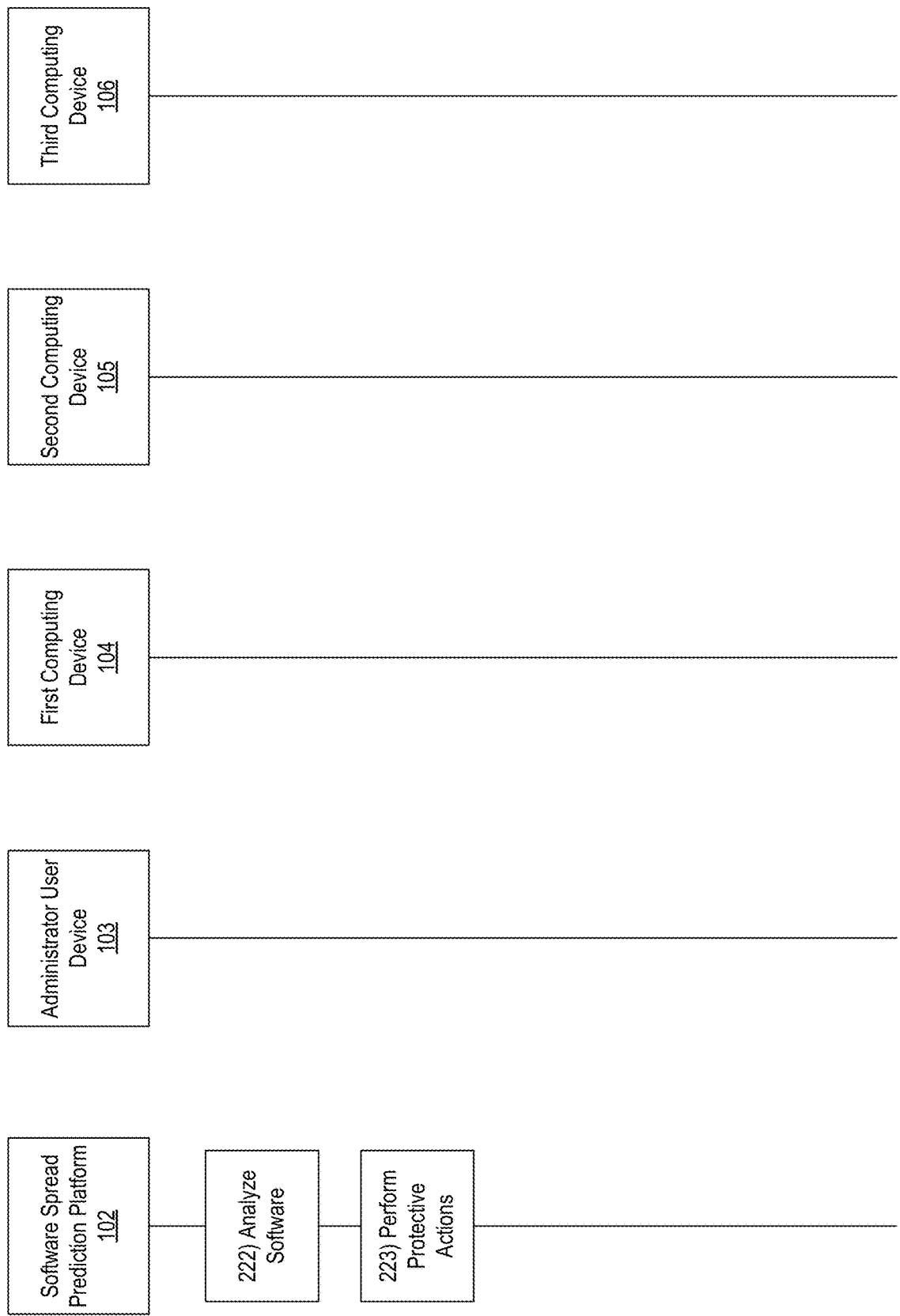

Referring to FIG. 2F, at step 222, the software spread prediction platform 102 may analyze the malicious software at the secure sandbox. For example, the software spread prediction platform 102 may allow the malicious software to play out in a manner that does not cause harm to the remaining devices on the network. Additionally or alternatively, the software spread prediction platform 102 may implement a Trojan horse (e.g., tracking information, generic customer information, and/or other information undetected by the malicious software) into the malicious software. In these instances, the software spread prediction platform 102 may use this information to track the malicious software back to its origin and/or identify additional information about the malicious software.

At step 223, the software spread prediction platform 102 may perform one or more additional protective actions based on the information identified at step 222. For example, the software spread prediction platform 102 may perform protective actions similar to those described above at steps 212, 215, and/or 219, and/or perform additional protective actions (e.g., notify an administrator of an entity identified as the source of the malicious software, and/or other actions). In some instances, the software spread prediction platform 102 may use this information to update the previously applied protective actions (e.g., based on identifying additional information about the spread). Additionally or alternatively, the software spread prediction platform 102 may use the information identified at the secure sandbox to update, refine, and/or otherwise provide feedback to the machine learning model.

Although the steering of the malicious software into a sandbox and the corresponding analysis are described at steps 222-223, these actions may be performed at other times during/throughout the above described event sequence without departing from the scope of the disclosure. For example, the software spread prediction platform 102 may steer the malicious software to a secure sandbox throughout the various time horizons and/or initially use the secure sandbox to identify information that may be fed into the machine learning model to identify the time horizons. Furthermore, although a single point of origination for the malicious software is described, any number of origination points may be identified (and thus time horizons for each origination point) may be identified without departing from the scope of the disclosure. Additionally, although three time horizons are described, any number of time horizons may be identified (and similarly, any number of devices within each time horizon) without departing from the scope of this disclosure.

Figure 3:
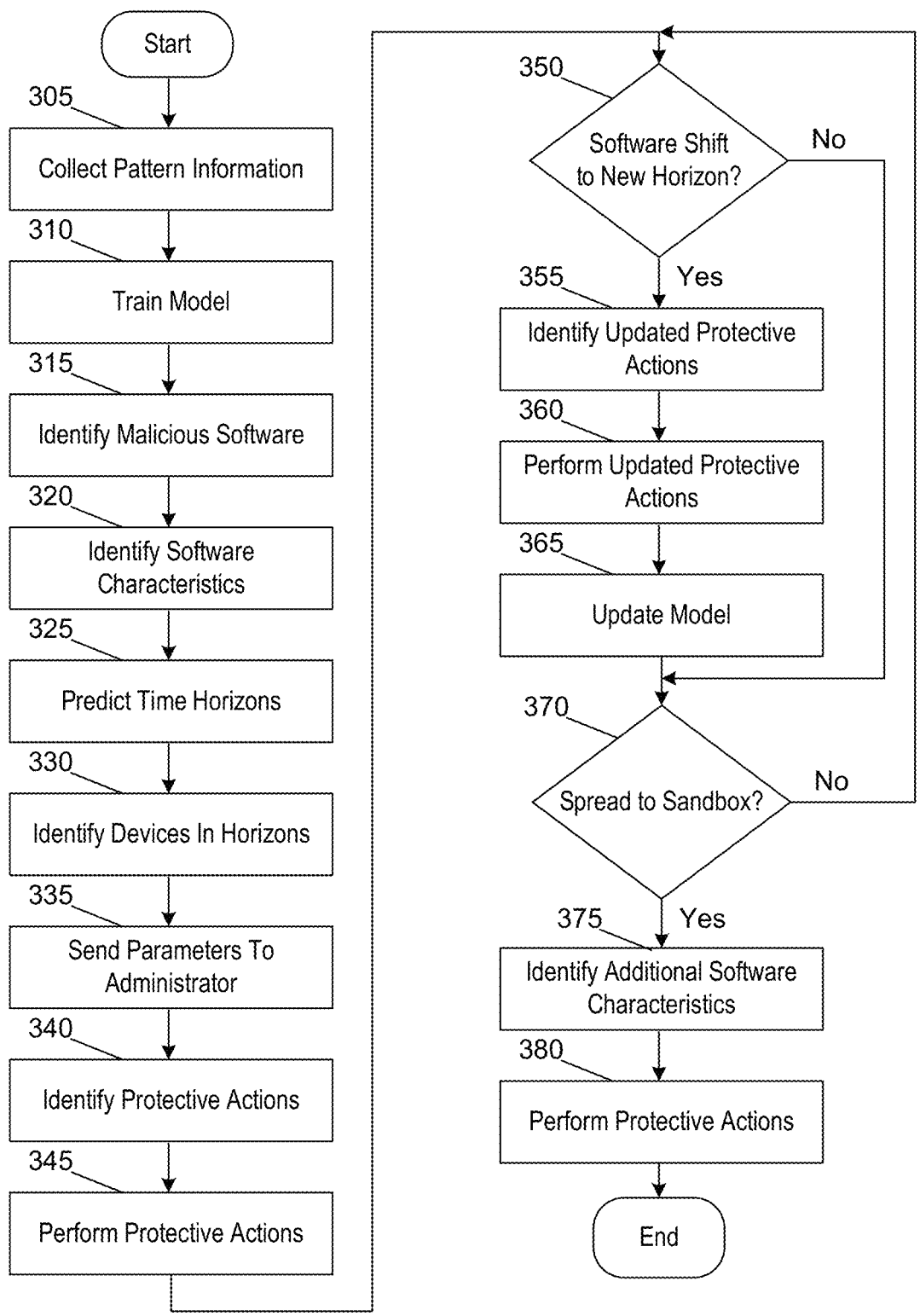
FIG. 3 depicts an illustrative method for implementing a hybrid machine learning and knowledge graph method to predict the spread of malicious software in accordance with one or more example embodiments.

FIG. 3 depicts an illustrative method for a hybrid machine learning and knowledge graph method to predict the spread of malicious software in accordance with one or more example embodiments. Referring to FIG. 3, at step 305, a computing platform having at least one processor, a communication interface, and memory may collect historical software spread pattern information. At step 310, the computing platform may use the historical software spread pattern information to train a machine learning model. At step 315, the computing platform may identify malicious software at a computing device. At step 320, the computing platform may identify software characteristics for the malicious software. At step 325, the computing platform may predict a plurality of time horizons based on the software characteristics and using the machine learning model. At step 330, the computing platform may identify computing devices in each of the plurality of time horizons. At step 335, the computing platform may send one or more parameters about the software spread to an administrator computing device for display. At step 340, the computing platform may identify one or more protective actions to perform for various computing devices across the plurality of time horizons. At step 345, the computing platform may perform the identified protective actions. At step 350, the computing platform may identify whether or not the malicious software has spread to a new time horizon. If the malicious software has not spread to a new time horizon, the computing platform may proceed to step 370. If the malicious software has spread to a new time horizon, the computing platform may proceed to step 355.

At step 355, the computing platform may identify one or more updated protective actions for the new time horizons. At step 360, the computing platform may perform the updated protective actions. At step 365, the computing platform may update the machine learning model based on the updated protective actions. At step 370, the computing platform may identify whether or not the malicious software has spread to a secure sandbox. If not, the computing platform may return to step 350. If so, the computing platform may proceed to step 375.

At step 375, the computing platform may identify additional characteristics of the malicious software by deploying tracking information into the malicious software. At step 380, the computing platform may perform one or more additional protective actions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using historical information, a machine learning model, wherein training the machine learning model configures the machine learning model to predict time horizons for spread of malicious software, wherein each of the time horizons includes a subset of a plurality of computing devices;
   identify malicious software at one computing device of the plurality of computing devices;
   input characteristics of the malicious software into the machine learning model to produce time horizons for the identified malicious software;
   identify, based on the time horizons for the identified malicious software, subsets of the plurality of computing devices, each corresponding to a particular time horizon; and
   perform, at a time within a first time horizon, a first security action for at least a first subset of the plurality of computing devices located within the first time horizon and a second security action for at least a second subset of the plurality of computing devices located within a second time horizon, wherein the first time horizon and the second time horizon indicate that the first subset of the plurality of computing devices will be affected by the identified malicious software prior to the second subset of the plurality of computing devices.

2. The computing platform of claim 1, wherein the plurality of computing devices includes devices of different device types.

3. The computing platform of claim 1, wherein training the machine learning model comprises training the machine learning model to predict the spread of malicious software based on velocity and acceleration of the malicious software.

4. The computing platform of claim 1, wherein inputting the characteristics of the malicious software into the machine learning model comprises:
identifying, that the identified malicious software has not previously been identified;
predicting, based on similarities between the identified malicious software and previously identified malicious software, characteristics for the malicious software; and
inputting, into the machine learning model, the characteristics.

5. The computing platform of claim 4, wherein inputting the characteristics of the malicious software into the machine learning model comprises:
identifying that the identified malicious software was previously identified;
accessing historical characteristic information for the identified malicious software; and
inputting, into the machine learning model, the historical characteristic information.

6. The computing platform of claim 5, wherein the characteristics and the historical characteristic information includes one or more of: location information, network traffic, date of attack, time of attack, or holiday information.

7. The computing platform of claim 1, wherein producing the time horizons for the malicious software comprises:
identifying, using the machine learning model, a velocity and an acceleration of the malicious software; and
identifying, using the machine learning model and based on the velocity and the acceleration, the time horizons, wherein the time horizons indicate predicted boundaries of a network that will be affected by the malicious software at various future times.

8. The computing platform of claim 1, wherein the memory stores additional computer-readable instructions that, when executed by the at least one processor, cause the computing platform to:
generate a knowledge graph that includes a plurality of computing devices and indicates relationships between the plurality of computing devices, wherein the subsets of the plurality of computing devices are identified using the knowledge graph.

9. The computing platform of claim 8, wherein identifying the subsets of the plurality of computing devices, each corresponding to a particular time horizon comprises:
identifying, by applying the time horizons to the knowledge graph, computing devices that are predicted to be affected by the malicious software at different future times.

10. The computing platform of claim 1, wherein performing the first security action comprises quarantining the first subset of the plurality of computing devices based on identifying that the first subset of the plurality of computing devices is within the first time horizon, and wherein performing the second security action comprises sending a firewall update to the second subset of the plurality of computing devices based on identifying that the second subset of the plurality of computing devices is outside of the first time horizon and within the second time horizon, wherein the firewall update is configured to block the malicious software from affecting the second subset of the plurality of computing devices.

11. The computing platform of claim 10, wherein the memory stores additional computer-readable instructions that, when executed by the at least one processor, cause the computing platform to:
identify that the malicious software has moved from the first time horizon to the second time horizon;
based on identifying that the malicious software has moved from the first time horizon to the second time horizon, identifying whether or not the first subset of the plurality of computing devices remain affected by the malicious software;
if the first subset of the plurality of computing devices is no longer affected by the malicious software:
stop performance of the first security action for the first subset of the plurality of computing devices, and
replace performance of the second security action for the second subset of the plurality of computing devices with performance of the first security action; and
if the first subset of the plurality of computing devices is still affected by the malicious software:
continue to perform the first security action for the first subset of the plurality of computing devices, and
replace performance of the second security action for the second subset of the plurality of computing devices with performance of the first security action.

12. The computing platform of claim 11, wherein performing the first security actions and the second security actions further comprise steering the malicious software into a secure sandbox.

13. The computing platform of claim 12, wherein steering the malicious software into the secure sandbox comprises:
identifying a type of device affected by the malicious software, and
causing the secure sandbox to resemble the type of device affected by the malicious software.

14. The computing platform of claim 13, wherein the memory stores additional computer-readable instructions that, when executed by the at least one processor, cause the computing platform to:
analyze, at the secure sandbox, the malicious software to identify additional information about the malicious software; and
update the first security action and the second security action based on the additional information.

15. The computing platform of claim 14, wherein the memory stores additional computer-readable instructions that, when executed by the at least one processor, cause the computing platform to:
embed, at the secure sandbox and into the malicious software, tracking information, wherein the additional information about the malicious software is identified using the tracking information.

16. A method comprising
at a computing platform comprising: at least one processor, a communication interface, and memory:
training, using historical information, a machine learning model, wherein training the machine learning model configures the machine learning model to predict time horizons for spread of malicious software, wherein each of the time horizons includes a subset of a plurality of computing devices;

identifying malicious software at one computing device of the plurality of computing devices;

inputting characteristics of the malicious software into the machine learning model to produce time horizons for the identified malicious software;

identifying, based on the time horizons for the identified malicious software, subsets of the plurality of computing devices, each corresponding to a particular time horizon; and performing, at a time within a first time horizon, a first security action for at least a first subset of the plurality of computing devices located within the first time horizon and a second security action for at least a second subset of the plurality of computing devices located within a second time horizon, wherein the first time horizon and the second time horizon indicate that the first subset of the plurality of computing devices will be affected by the identified malicious software prior to the second subset of the plurality of computing devices.

17. The method of claim 16, wherein the plurality of computing devices includes devices of different device types.

18. The method of claim 16, wherein training the machine learning model comprises training the machine learning model to predict the spread of malicious software based on velocity and acceleration of the malicious software.

19. The method of claim 16, wherein inputting the characteristics of the malicious software into the machine learning model comprises:

identifying, that the identified malicious software has not previously been identified;

predicting, based on similarities between the identified malicious software and previously identified malicious software, characteristics for the malicious software; and inputting, into the machine learning model, the characteristics.

20. One or more non-transitory computer-readable media storing instructions that, when executed by a computing platform comprising at least one processor, a communication interface, and memory, cause the computing platform to:

train, using historical information, a machine learning model, wherein training the machine learning model configures the machine learning model to predict time horizons for spread of malicious software, wherein each of the time horizons includes a subset of a plurality of computing devices;

identify malicious software at one computing device of the plurality of computing devices;

input characteristics of the malicious software into the machine learning model to produce time horizons for the identified malicious software;

identify, based on the time horizons for the identified malicious software, subsets of the plurality of computing devices, each corresponding to a particular time horizon; and perform, at a time within a first time horizon, a first security action for at least a first subset of the plurality of computing devices located within the first time horizon and a second security action for at least a second subset of the plurality of computing devices located within a second time horizon, wherein the first time horizon and the second time horizon indicate that the first subset of the plurality of computing devices will be affected by the identified malicious software prior to the second subset of the plurality of computing devices.

* * * * *